(12) United States Patent
E.Deligero

(10) Patent No.: US 10,701,233 B2
(45) Date of Patent: Jun. 30, 2020

(54) IMAGE PROCESSING DEVICE AND IMAGE PROCESSING METHOD

(71) Applicant: KYOCERA Document Solutions Inc., Osaka-shi, Osaka (JP)

(72) Inventor: Anne Faye E.Deligero, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/337,203

(22) PCT Filed: May 19, 2017

(86) PCT No.: PCT/JP2017/018847
§ 371 (c)(1),
(2) Date: Mar. 27, 2019

(87) PCT Pub. No.: WO2018/061300
PCT Pub. Date: Apr. 5, 2018

(65) Prior Publication Data
US 2019/0230230 A1    Jul. 25, 2019

(30) Foreign Application Priority Data

Sep. 29, 2016   (JP) .................................. 2016-190755

(51) Int. Cl.
*H04N 1/00* (2006.01)
*G06K 15/02* (2006.01)
(Continued)

(52) U.S. Cl.
CPC ............ *H04N 1/0097* (2013.01); *B41J 21/00* (2013.01); *B41J 29/38* (2013.01); *G03G 15/36* (2013.01);
(Continued)

(58) Field of Classification Search
None
See application file for complete search history.

(56) References Cited

U.S. PATENT DOCUMENTS 8,031,352 B2 * 10/2011 Yokoyama ......... H04N 1/32005
358/1.15
2005/0259872 A1 * 11/2005 Honma ................. G06K 9/6821
382/182
(Continued)

FOREIGN PATENT DOCUMENTS

| JP | 2003069803 A | 3/2003 |
| JP | 2005323305 A | 11/2005 |

(Continued)

*Primary Examiner* — Beniyam Menberu
(74) *Attorney, Agent, or Firm* — Alleman Hall Creasman & Tuttle LLP

(57) ABSTRACT

A storage portion (15) stores one or more pieces of automatic process setting information (20) including detection target information and processing content corresponding to the detection target information, the detection target information composed of a specific character string, a specific figure, or a specific combination thereof. An image data acquiring portion (161) acquires image data of a document (30). A detection processing portion (162) detects the detection target information from the document (30) based on the image data. A process executing portion (163) processes the image data according to the processing content included in the automatic process setting information (20), when the detection target information included in the automatic process setting information (20) is detected from the document (30) by the detection processing portion (162).

8 Claims, 8 Drawing Sheets

(51) Int. Cl.
  *G03G 15/36* (2006.01)
  *G06F 3/12* (2006.01)
  *B41J 21/00* (2006.01)
  *B41J 29/38* (2006.01)

(52) U.S. Cl.
  CPC .......... *H04N 1/00* (2013.01); *H04N 1/00331* (2013.01); *H04N 2201/0094* (2013.01)

(56) References Cited

U.S. PATENT DOCUMENTS

| | | | |
|---|---|---|---|
| 2006/0028693 A1 | 2/2006 | Kagawa | |
| 2007/0273911 A1* | 11/2007 | Nakajima | G06F 9/45512 358/1.13 |
| 2008/0074713 A1* | 3/2008 | Nakawaki | H04N 1/00912 358/474 |
| 2008/0151279 A1 | 6/2008 | Yamada | |
| 2008/0260260 A1* | 10/2008 | Yamamoto | G06K 9/46 382/209 |
| 2010/0321727 A1* | 12/2010 | Kanai | H04N 1/00204 358/1.15 |
| 2011/0002014 A1* | 1/2011 | Tani | H04N 1/00244 358/403 |
| 2011/0090534 A1* | 4/2011 | Terao | G06Q 10/10 358/1.15 |
| 2016/0147386 A1* | 5/2016 | Han | H04N 1/00411 715/838 |

FOREIGN PATENT DOCUMENTS

| | | |
|---|---|---|
| JP | 200650161 A | 2/2006 |
| JP | 2008158736 A | 7/2008 |

\* cited by examiner

FIG. 6

AUTOMATIC PROCESS SETTING INFORMATION

| SETTING ID | DETECTION TARGET INFORMATION | PROCESSING CONTENT | |
|---|---|---|---|
| AUTOMATIC PROCESS SETTING C | "PAY STATEMENT" | PROCESS C | ~20C |
| AUTOMATIC PROCESS SETTING D | "PAY STATEMENT 2015" | PROCESS D | ~20D |
| AUTOMATIC PROCESS SETTING E | "PAY STATEMENT 2016" | PROCESS E | ~20E |

FIG. 9

| SETTING ID | DETECTION TARGET INFORMATION | PROCESSING CONTENT | |
|---|---|---|---|
| | AUTOMATIC PROCESS SETTING INFORMATION | | |
| AUTOMATIC PROCESS SETTING F | TODAY'S DATE | PRINT | 20F |
| AUTOMATIC PROCESS SETTING G | NAME INCLUDED IN NAME LIST | PRINT AS MANY COPIES AS NUMBER OF PEOPLE | 20G |
| AUTOMATIC PROCESS SETTING H | NAME INCLUDED IN ADDRESS BOOK | TRANSMIT EMAIL | 20H |

IMAGE PROCESSING DEVICE AND IMAGE PROCESSING METHOD

TECHNICAL FIELD

The present invention relates to an image processing device and an image processing method.

BACKGROUND ART

There is known a copying apparatus that can, when a specific character string or image is included in an image read from a document, automatically edit a portion of the image including the character string or the like, and make a copy of the document (for example, see PTL1).

CITATION LIST

Patent Literature

[PTL 1] Japanese Patent Application Publication No. 2003-69803

SUMMARY OF THE INVENTION

Problems to be Solved by the Invention

However, the copying apparatus only automatically edits the portion including the character string or the like, and does not perform a process (for example, a transmission process, a print process, a storage process) on the image data of the document according to processing content corresponding to the character string or the like included in the image of the document.

The present invention has been made in view of such conventional circumstances, and it is an object of the present invention to provide an image processing device and an image processing method that can process image data of a document according to processing content corresponding to a character string or the like included in an image of the document.

Solution to the Problems

An image processing device according to an aspect of the present invention includes a storage portion, an image data acquiring portion, a detection processing portion, and a process executing portion. The storage portion is configured to store one or more pieces of automatic process setting information including detection target information and processing content corresponding to the detection target information, the detection target information composed of a specific character string, a specific figure, or a specific combination thereof. The image data acquiring portion is configured to acquire image data of a document. The detection processing portion is configured to detect the detection target information from the document based on the image data. The process executing portion is configured to process the image data according to the processing content included in the automatic process setting information, when the detection target information included in the automatic process setting information is detected from the document by the detection processing portion.

An image processing method according to another aspect of the present invention is an image processing method in an image processing device having a storage portion for storing one or more pieces of automatic process setting information including detection target information and processing content corresponding to the detection target information, the detection target information composed of a specific character string, a specific figure, or a specific combination thereof. The image processing method includes an image data acquiring step, a detection processing step, and a process executing step. In the image data acquiring step, image data of a document is acquired. In the detection processing step, the detection target information is detected from the document based on the image data. In the process executing step, the image data is processed according to the processing content included in the automatic process setting information, when the detection target information included in the automatic process setting information is detected from the document in the detection processing step.

Advantageous Effects of the Invention

According to the present invention, it is possible to provide an image processing device and an image processing method capable of processing image data of a document according to processing content corresponding to a character string or the like included in an image of the document.

BRIEF DESCRIPTION OF THE DRAWINGS

FIG. 6 is a diagram showing an example of automatic process setting information used in the image processing device according to the embodiment of the present invention.

FIG. 9 is a diagram showing an example of automatic process setting information used in the image processing device according to the embodiment of the present invention.

DESCRIPTION OF EMBODIMENTS

The following describes an embodiment of the present invention with reference to the accompanying drawings for the understanding of the invention. It should be noted that the following embodiment is an example of a specific embodiment of the present invention and should not limit the technical scope of the present invention.

[Configuration of Image Processing Device 1]

Figure 1:
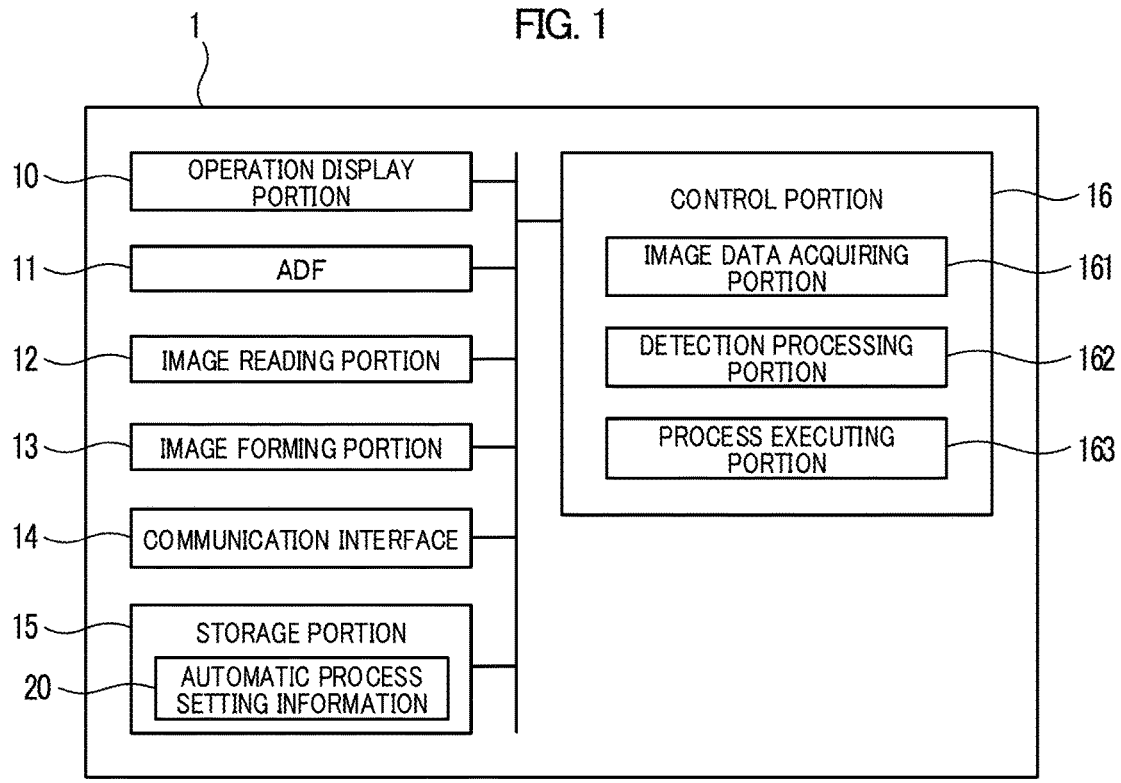
FIG. 1 is a block diagram showing a system configuration of an image processing device according to an embodiment of the present invention.

As shown in FIG. 1, an image processing device 1 according to an embodiment of the present invention includes an operation/display portion 10, an ADF (Auto Document Feeder) 11, an image reading portion 12, an image forming portion 13, a communication interface 14, a storage portion 15, and a control portion 16. Specifically, the image processing device 1 is a multifunction peripheral having a printer function, a scanner function, a copy function, a facsimile function, or the like. It is noted that the present invention is not limited to a multifunction peripheral, and is applicable to image processing devices such as a copier, a printer, and a facsimile device.

The operation/display portion 10 includes a display portion such as a liquid crystal display for displaying information, and an operation portion such as a touch panel and operation buttons for receiving a user operation.

The ADF 11 includes a document setting portion, a conveying roller, a document holder, and a sheet discharge portion, and is an automatic document feeding device for feeding a document to be read by the image reading portion 12.

Figure 4:
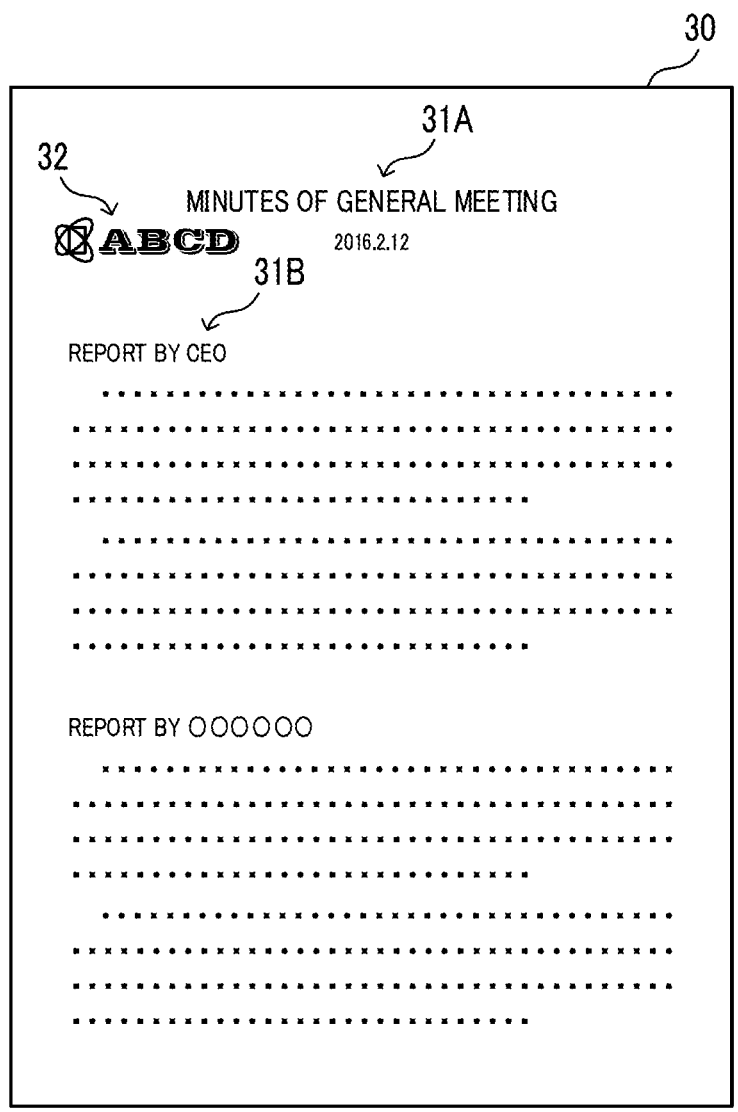
FIG. 4 is a diagram showing an example of a document used in the image processing device according to the embodiment of the present invention.

The image reading portion 12 includes a document table, a light source, a mirror, an optical lens, and a CCD (Charge Coupled Device), and is configured to read an image from a document 30 (see FIG. 4) and output the image as image data.

The image forming portion 13 is configured to execute a print process based on the image data by an electrophotographic method or an inkjet method, and forms an image on the document based on the image data. For example, in a case where the image forming portion 13 is an electrophotographic image forming portion, the image forming portion 13 includes a photoconductor drum, a charger, an exposure device, a developing device, a transfer device, and a fixing device.

The communication interface 14 is configured to execute a communication process according to a predetermined communication protocol with an information processing device such as an external facsimile device or a personal computer, via a communication network such as a telephone line, the internet, or a LAN.

The storage portion 15 is a nonvolatile storage portion such as a hard disk or an EEPROM (registered trademark). The storage portion 15 stores various control programs executed by the control portion 16, and various types of data. For example, automatic process setting information 20 (see FIG. 2) is stored in the storage portion 15.

Meanwhile, there is known a copying apparatus that can, when a specific character string or image is included in an image read from the document 30, automatically edit a portion of the image including the character string or the like, and make a copy of the document 30. However, the copying device is configured to only automatically edit the portion such as the character string, and is not configured to execute a process (for example, a transmission process, a print process, a storage process) on the image data of the document 30 according to processing content corresponding to the character string or the like included in the image of the document 30. On the other hand, the image processing device 1 according to the present embodiment is capable of processing image data of the document 30 according to processing content corresponding to the character string or the like included in the image of the document 30, by a configuration and operations described below.

Figure 2:
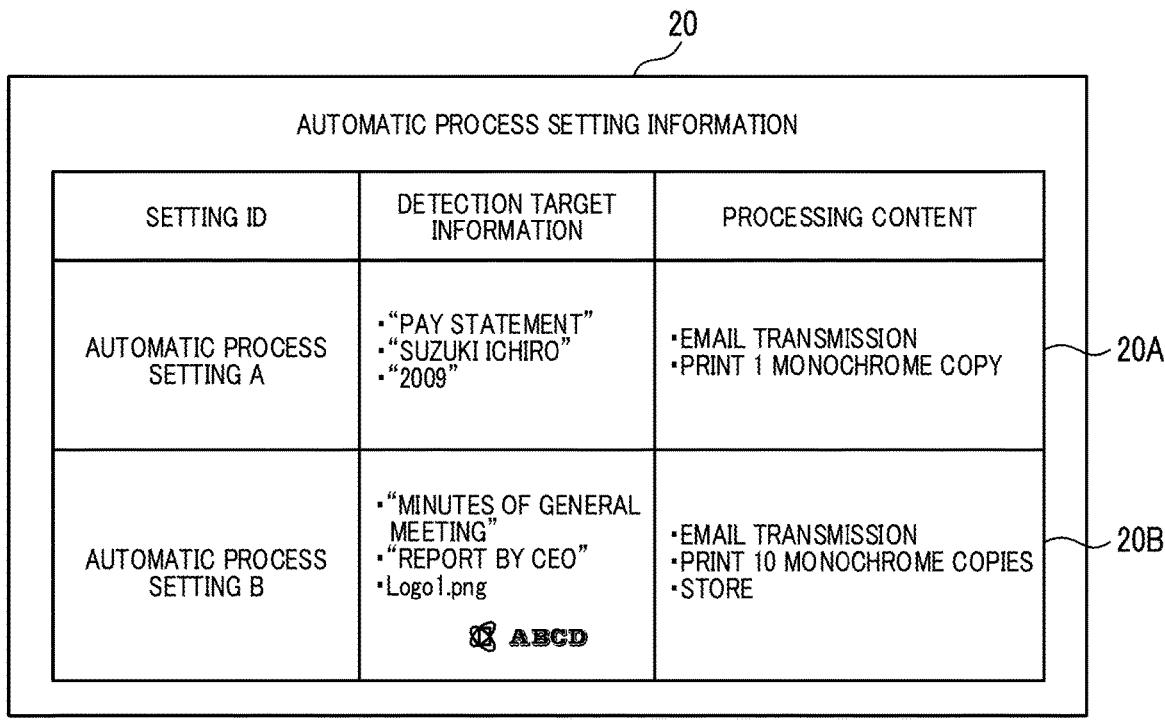
FIG. 2 is a diagram showing an example of automatic process setting information used in the image processing device according to the embodiment of the present invention.

As shown in FIG. 2, the automatic process setting information 20 stored in the storage portion 15 includes detection target information, and processing content corresponding to the detection target information, the detection target information being composed of a specific character string, a specific figure, or a specific combination thereof. When a plurality of pieces of automatic process setting information 20 (for example, automatic process setting information 20A and automatic process setting information 20B shown in FIG. 2) are stored in the storage portion 15, the pieces of automatic process setting information 20 are identified by their setting IDs. It is noted that the automatic process setting information 20 is created, changed, added, and deleted as necessary by, for example, a user operation on the operation/display portion 10.

The control portion 16 includes control devices such as a CPU, a ROM, and a RAM. The CPU is a processor for executing various kinds of arithmetic processing. The ROM is a nonvolatile storage portion in which information such as a control program for making the CPU execute various processes is preliminarily stored. The RAM is a volatile or nonvolatile storage portion used as a temporary storage memory (work area) for various processes executed by the CPU.

Specifically, the control portion 16 includes an image data acquiring portion 161, a detection processing portion 162, and a process executing portion 163. It is noted that the control portion 16 functions as these processing portions by executing various processes according to the control program. In addition, the control portion 16 may be provided with an electronic circuit for realizing a part of these processing portions or a plurality of processing functions.

The image data acquiring portion 161 acquires image data of the document 30. For example, the image data acquiring portion 161 acquires the image data from the image reading portion 12 for reading the image of the document 30. Alternatively, the image data acquiring portion 161 may acquire the image data of the document 30 from an information processing device (host device) such as a personal computer via the communication interface 14.

Based on the image data, the detection processing portion 162 detects the detection target information composed of a specific character string, a specific figure, or a specific combination thereof from the document 30. Specifically, the detection processing portion 162 detects, from the document 30, the detection target information included in the automatic process setting information 20 stored in the storage portion 15. In particular, the detection processing portion 162 detects the detection target information from a predetermined specific area, such as an area within a printing range in which text of the document 30 is written. For example, the automatic process setting information 20A shown in FIG. 2 includes the following three character strings: "pay statement", "Suzuki Ichiro", and "2009" as the detection target information. In addition, the automatic process setting information 20B shown in FIG. 2 includes two character strings, "minutes of general meeting" and "report by CEO", and one figure (logo mark) represented by a piece of image data "Logo1.png" as the detection target information. In this case, the detection processing portion 162 detects the aforementioned character strings and figure from the document 30. It is noted that the detection processing portion 162 detects a character string and a figure by using, for example, a known character recognition process and pattern matching process.

When the detection processing portion 162 has detected the detection target information from the document 30, the process executing portion 163 processes the image data according to preset processing content corresponding to the detection target information. Specifically, when the detection processing portion 162 has detected the detection target information included in the automatic process setting information 20 from the document 30, the process executing portion 163 processes the image data according to processing content included in the automatic process setting information 20. It is noted that processing content included in the automatic process setting information 20 may relate to at least one of a transmission process (facsimile transmission or email transmission), a print process, and a storage process of the image data.

[First Embodiment of Automatic Process]

Figure 3:
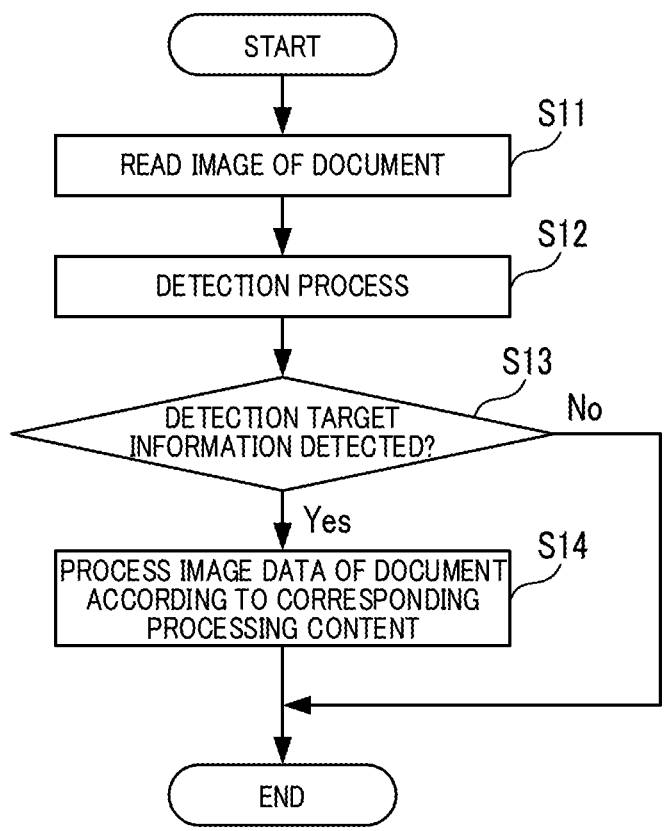
FIG. 3 is a flowchart showing an example of a procedure of a first embodiment of an automatic process executed in the image processing device according to the embodiment of the present invention.

Next, with reference to FIG. 3, a description is given of an example of a procedure of a first embodiment of an automatic process executed by the control portion 16. Here, steps S11, S12, . . . represent numbers of processing procedures (steps) executed by the control portion 16. It is noted that the automatic process may be started in response to detection of a specific operation (for example, pressing of a soft key for starting the automatic process) on the operation/display portion 10. Here, a description is given of a case where a single-page document 30 is read by the image reading portion 12.

<Step S11>

First, in step S11 (image data acquiring step), the control portion 16 (image data acquiring portion 161) makes the image reading portion 12 read an image of the document 30, and acquires image data of the document 30.

<Step S12>

In step S12 (detection processing step), the control portion 16 (detection processing portion 162) detects the detection target information included in the automatic process setting information 20 from the document 30, based on the image data acquired in step S11 and the automatic process setting information 20 stored in the storage portion 15. For example, in a case where the automatic process setting information 20 shown in FIG. 2 is stored in the storage portion 15, the control portion 16 detects the character strings "pay statement", "Suzuki Ichiro", "2009", "minutes of general meeting", and "report by CEO", as well as the figure represented by "Logo1.png" from the document 30. As a result, for example, a character string 31A "minutes of general meeting", a character string 31B "report by CEO", and a FIG. 32 represented by "Logo1.png" are detected from the document 30 shown in FIG. 4.

<Step S13>

In step S13, based on a detection result of step S12, the control portion 16 determines whether or not the detection target information included in any of the pieces of automatic process setting information 20 stored in the storage portion 15 has been detected from the document 30. When it is determined that the detection target information included in any of the pieces of automatic process setting information 20 has been detected (S13: Yes), the process moves to step S14. On the other hand, when it is determined that none of the detection target information included in the pieces of automatic process setting information 20 has been detected (S13: No), the automatic process ends.

<Step S14>

In step S14 (process executing step), the control portion 16 (process executing portion 163) processes the image data according to processing content corresponding to the detected detection target information.

For example, in a case where character strings "pay statement", "Suzuki Ichiro", and "2009" have been detected from the document 30, the control portion 16 processes the image data of the document 30 according to processing content included in the automatic process setting information 20A shown in FIG. 2. That is, the control portion 16 transmits the image data by email to a predetermined address (an address represented by a pre-registered electronic mail address) via the communication interface 14, and prints one monochrome copy of the image data using the image forming portion 13.

In addition, for example, in a case where character strings "minutes of general meeting" and "report by CEO", and the figure represented by "Logo1.png" have been detected from the document 30, the control portion 16 processes the image data of the document 30 according to processing content included in the automatic process setting information 20B shown in FIG. 2. That is, the control portion 16 transmits the image data by email to a predetermined address via the communication interface 14, prints ten monochrome copies of the image data using the image forming portion 13, and stores the image data in a predetermined storage area (for example, in a predetermined folder in the storage portion 15). Then, the automatic process ends.

As described above, according to the present embodiment, when preset detection target information is detected from the document 30, the image data of the document 30 is processed according to the processing content corresponding to the detection target information. That is, according to the present embodiment, it is possible to process the image data of the document 30 according to the processing content corresponding to the character string or the like included in the document 30. Accordingly, since image data of the document 30 created periodically, such as a pay statement or minutes for a general meeting, can be easily processed according to pre-registered processing content, labor of a user is reduced.

It is noted that while in the present embodiment, a case is described where the image data is automatically processed according to processing content corresponding to the detected detection target information, the present invention is not limited to this case. In another embodiment, prior to execution of the processing in step S14, the control portion 16 may display the processing content on the operation/display portion 10, and confirm with a user whether or not the processing may be executed according to the processing content. When a specific operation (for example, pressing of an OK key or a start key) on the operation/display portion 10 is detected, the control portion 16 may process the image data according to the processing content.

It is further noted that in a case where the detection target information included in multiple pieces of automatic process setting information 20 is detected from the same document 30, the control portion 16 may process the image data of the document 30 according to the processing content included in the multiple pieces of automatic process setting information 20. Alternatively, the control portion 16 may ask a user to choose one of the multiple pieces of automatic process setting information 20 that includes processing content according to which the image data of the document 30 should be processed. Alternatively, priority may be preliminarily set for each piece of automatic process setting information 20, and the control portion 16 may process the image data according to processing content included in a piece of automatic process setting information 20 with highest priority among the multiple pieces of automatic process setting information 20.

[Second Embodiment of Automatic Process]

Figure 5:
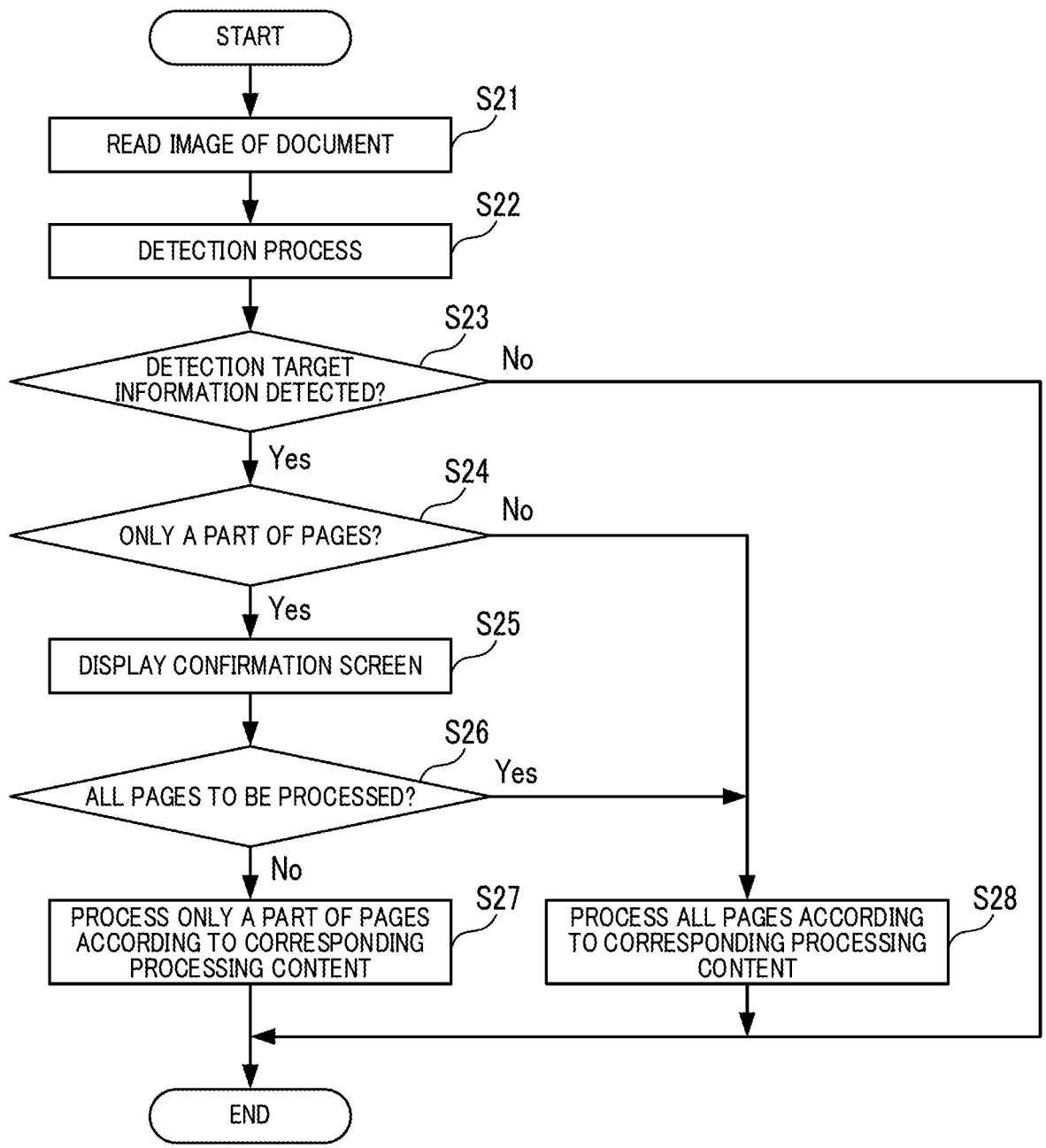
FIG. 5 is a flowchart showing an example of a procedure of a second embodiment of the automatic process executed in the image processing device according to the embodiment of the present invention.

Next, with reference to FIG. 5, a description is given of an example of a procedure of a second embodiment of the automatic process. Here, steps S21, S22, . . . represent numbers of processing procedures (steps) executed by the control portion 16. Here, a case is described where a document 30 having a plurality of pages is read by the image reading portion 12.

<Step S21>

First, in step S21, the control portion 16 (image data acquiring portion 161) may use the ADF 11 to read the document 30 having a plurality of pages and acquire image data of the document 30.

<Step S22>

In step S22, the control portion 16 (detection processing portion 162) detects the detection target information included in the automatic process setting information 20 from the plurality of pages of the document 30, based on the image data acquired in step S21 and the automatic process setting information 20 stored in the storage portion 15. For example, in a case where the automatic process setting information 20 shown in FIG. 2 is stored in the storage portion 15, the control portion 16 detects the character strings "pay statement", "Suzuki Ichiro", "2009", "minutes of general meeting", and "report by CEO", as well as the figure represented by "Logo1.png" from the plurality of pages of the document 30.

<Step S23>

In step S23, based on a detection result of step S22, the control portion 16 determines whether or not the detection target information included in any of the pieces of automatic process setting information 20 stored in the storage portion 15 has been detected from at least one page of the document 30. When it is determined that the detection target information included in any of the pieces of automatic process setting information 20 has been detected (S23: Yes), the process moves to step S24. On the other hand, when it is determined that none of the detection target information included in the pieces of automatic process setting information 20 has been detected (S23: No), the automatic process ends.

<Step S24>

In step S24, the control portion 16 determines whether or not the detection target information has been detected from only a part of the pages of the document 30. When it is determined that the detection target information has been detected from only a part of the pages of the document 30 (S24: Yes), the process moves to step S26. On the other hand, when it is determined that the detection target information has been detected from all of the pages of the document 30 (S24: No), the process moves to step S28.

<Step S25>

In step S25, the control portion 16 displays a confirmation screen (not shown) on the operation/display portion 10 to ask a user which page should be processed. For example, when the detection target information included in the automatic process setting information 20B shown in FIG. 2 is detected only from a part of the pages of the document 30 (for example, a first page of the document 30), the control portion 16 displays the confirmation screen on the operation/display portion 10, including a message such as, "Detection target information corresponding to automatic process setting B has been detected from only a part of pages of the document. Would you like to process only the part of pages according to processing content corresponding to automatic process setting B? Or, would you like to process all pages?", and receives a selection operation from the user.

In step S26, the control portion 16 determines based on the selection operation whether or not all of the pages should be processed. When it is determined that all of the pages should be processed (S26: Yes), the process moves to step S28. On the other hand, when it is determined that only the part of pages should be processed (S26: No), the process moves to step S27.

<Step S27>

In step S27, the control portion 16 (process executing portion 163) processes part of the image data corresponding to the part of pages, according to preset processing content corresponding to the detection target information detected from the part of pages. For example, in a case where the detection target information included in the automatic process setting information 20B shown in FIG. 2 is detected only from a first page of the document 30, the control portion 16 transmits by email, prints, and stores part of the image data corresponding to the first page. Then, the automatic process ends.

<Step S28>

In step S28, the control portion 16 (process executing portion 163) processes the image data corresponding to all of the pages, according to preset processing content corresponding to the detection target information detected from the part of pages. For example, in a case where the detection target information included in the automatic process setting information 20B shown in FIG. 2 is detected only from a first page of the document 30, the control portion 16 transmits by email, prints, and stores the image data corresponding to all of the pages. Then, the automatic process ends.

It is noted that while in the present embodiment, when the detection target information is detected only from a part of pages of the document 30, a user is asked to select which of only the part of pages or all of the pages should be processed, the present invention is not limited to this. In another embodiment, for example, each piece of automatic process setting information 20 may be preset to specify whether only the part of pages or all of the pages should be processed.

Another Embodiment

Figure 7:
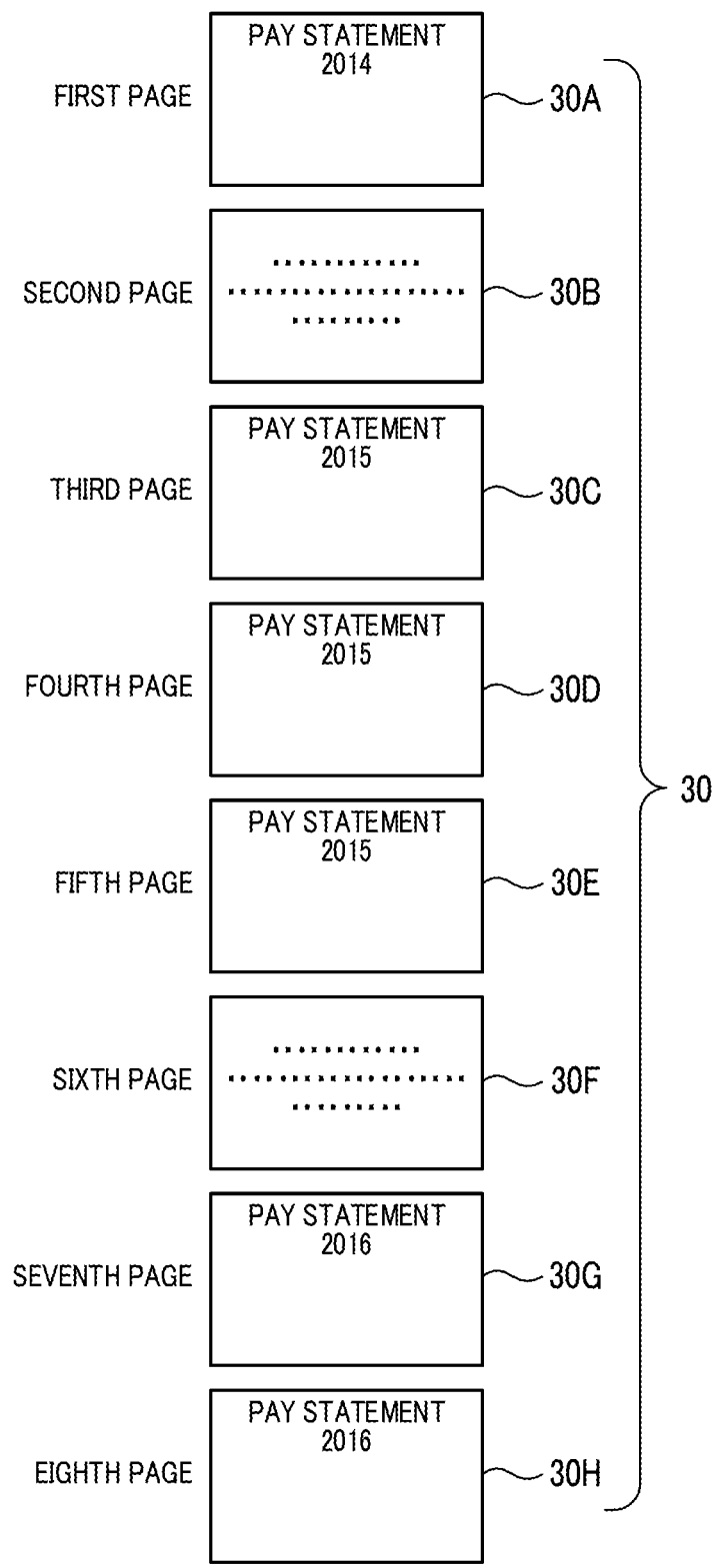
FIG. 7 is a diagram showing an example of a document used in the image processing device according to the embodiment of the present invention.

Next, with reference to FIG. 6 and FIG. 7, a description is given of an example of an operation of the control portion 16 (process executing portion 163), in a case where a plurality of pieces of automatic process setting information 20C to 20E as shown in FIG. 6 are stored in the storage portion 15, and a document 30 having a plurality of pages as shown in FIG. 7 is read by the image reading portion 12.

In FIG. 6, the automatic process setting information 20C includes a character string "pay statement" as the detection target information. The automatic process setting information 20D includes a character string "pay statement 2015" as the detection target information. The automatic process setting information 20E includes a character string "pay statement 2016" as the detection target information.

The document 30 shown in FIG. 7 includes 8 pages from a first page 30A to an eighth page 30H.

The first page 30A includes the character string "pay statement 2014". Accordingly, the detection processing portion 162 detects the character string "pay statement" that is the detection target information corresponding to the automatic process setting information 20C from the first page 30A.

The pages from the third page 30C to the fifth page 30E include the character string "pay statement 2015". Accordingly, the detection processing portion 162 detects the character string "pay statement" that is the detection target information corresponding to the automatic process setting information 20C, and the character string "pay statement 2015" that is the detection target information corresponding to the automatic process setting information 20D from the third page 30C to the fifth page 30E.

The seventh page 30G and the eighth page 30H include the character string "pay statement 2016". Accordingly, the detection processing portion 162 detects the character string "pay statement" that is the detection target information corresponding to the automatic process setting information 20C, and the character string "pay statement 2016" that is the detection target information corresponding to the automatic process setting information 20E from the seventh page 30G and the eighth page 30H.

In this case, the process executing portion 163 may generate groups of pages including the detection target information, the groups being individually generated for each piece of automatic process setting information 20C to 20E, based on a detection result of the detection processing portion 162 as described above. Then, for each group, the process executing portion 163 processes the image data corresponding to the pages of the group, according to processing content included in the automatic process setting information 20 corresponding to the group.

Specifically, based on the detection result of the detection processing portion 162, the process executing portion 163 generates a group (hereinafter referred to as a first group) of pages including the detection target information (the character string "pay statement") corresponding to the automatic process setting information 20C, a group (hereinafter referred to as a second group) of pages including the detection target information (the character string "pay statement 2015") corresponding to the automatic process setting information 20D, and a group (hereinafter referred to as a third group) of pages including the detection target information (the character string "pay statement 2016") corresponding to the automatic process setting information 20E. The first group is composed of six pages that are the first page 30A, the third page 30C to the fifth page 30E, the seventh page 30G, and the eighth page 30H. The second group is composed of three pages that are the third page 30C to the fifth page 30E. The third group is composed of two pages that are the seventh page 30G and the eighth page 30H.

The process executing portion 163 processes the image data corresponding to the six pages in the first group according to processing content (that is, process C) included in the automatic process setting information 20C. Furthermore, the process executing portion 163 processes the image data corresponding to the three pages in the second group according to processing content (that is, process D) included in the automatic process setting information 20D. Furthermore, the process executing portion 163 processes the image data corresponding to the two pages in the third group according to processing content (that is, process E) included in the automatic process setting information 20E.

It is noted that the process C may be a monochrome printing process on both sides in a "2 in 1" layout. The process D may be a storage process of storing the image data to a folder named "2015" in the storage portion 15. The process E may be a storage process of storing the image data to a folder named "2016" in the storage portion 15.

Figure 8:
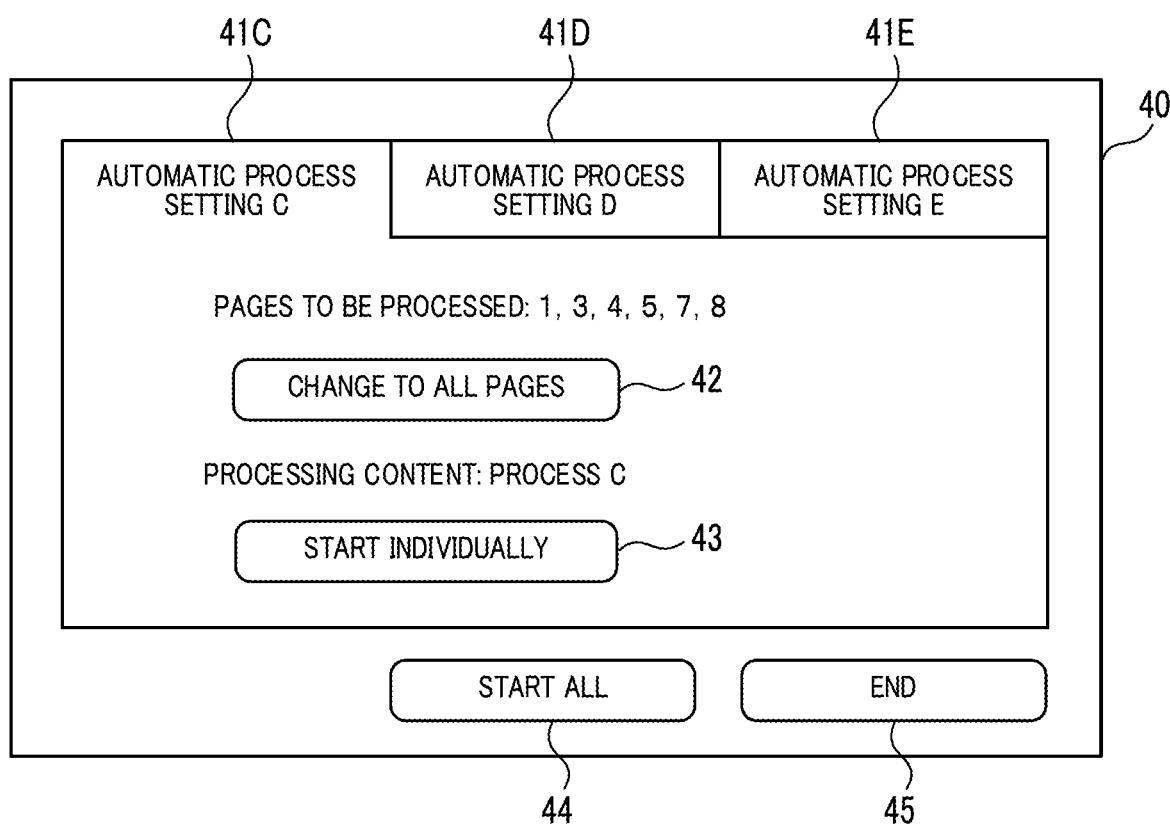
FIG. 8 is a diagram showing an example of a confirmation screen used in the image processing device according to the embodiment of the present invention.

In addition, before processing the image data for the respective groups, the process executing portion 163 may display a list of pages included in the groups on the operation/display portion 10, and confirm with a user whether or not the image data corresponding to the pages in the groups may be processed according to the processing content. For example, the process executing portion 163 may display a confirmation screen 40 as shown in FIG. 8 on the operation/display portion 10. The confirmation screen 40 includes tabs 41C to 41E. When the tab 41C is selected by the user, a list of the pages in the first group is shown. When the tab 41D is selected by the user, a list of the pages in the second group is shown. When the tab 41E is selected by the user, a list of the pages in the third group is shown. For example, when the tab 41C is selected by the user, pages to be processed and the processing content are displayed, as shown in FIG. 8. Here, when the user selects a button 42, the process executing portion 163 changes the pages to be processed to all pages for an automatic process setting C. In addition, when the user selects a button 43, the process executing portion 163 starts a process relating to the automatic process setting C (that is, the process C). It is noted that when the user selects a button 44, the process executing portion 163 begins processes relating to all of the automatic process setting C to E (that is, processes C to E). In addition, when the user selects a button 45, the process executing portion 163 ends the automatic process.

[Modified Example of Automatic Process Setting Information]

Next, with reference to FIG. 9, various modifications of the automatic process setting information 20 are described.

In a piece of automatic process setting information 20F shown in FIG. 9, the detection target information is "today's date", and the processing content is "print". The control portion 16 (detection processing portion 162), for example, determines whether or not today's date (for example, a character string such as "February 12" or "2/12") is included in the document 30, based on current data and time information acquired from an RTC (Real Time Clock, not shown) included in the image processing device 1. When today's date is detected from the document 30, a print process is performed. It is noted that the detection target information is not limited to the character string indicating "today's date", and may be a character string indicating a date satisfying a specific condition, such as "any date in the most recent week".

In a piece of automatic process setting information 20G shown in FIG. 9, the detection target information is "name included in name list", and the processing content is "print for number of people". The control portion 16 (detection processing portion 162), for example, determines whether or not a name included in a name list is included in the document 30, based on name list data (not shown) stored in the storage portion 15 or the like. When a name included in the name list is detected from the document 30, a print process is performed as many times as the number of names detected from the document 30. For example, if names of 5 people included in the name list are detected, 5 copies of the image data of the document 30 are printed. In this way, processing content included in the automatic process setting information 20 may be a print process for printing as many copies of the image data as the number of character strings satisfying a specific condition (for example, character strings indicating name included in a name list), detected by the detection processing portion 162.

In a piece of automatic process setting information 20H shown in FIG. 9, the detection target information is "name included in address book", and the processing content is "transmit email". The control portion 16 (detection processing portion 162), for example, determines whether or not a name included in an address book is included in the document 30, based on address book data (not shown) stored in the storage portion 15 or the like. When a name included in the address book is detected from the document 30, email transmission is performed using an electronic mail address corresponding to the name included in the address book. For example, if names of 5 people included in the address book are detected, the image data of the document 30 is transmitted by email to the 5 people using the electronic mail addresses of the 5 people.

It is noted that while in the present embodiment, a case is described where the document 30 is read by the image reading portion 12, the present invention is not limited to this case, and the present invention may be applied to a case where the image data of the document 30 is acquired from the information processing device (host device) such as a personal computer, via the communication interface 14.

The invention claimed is:

1. An image processing device comprising:
a storage portion configured to store one or more pieces of automatic process setting information including detection target information and processing content corresponding to the detection target information, the detection target information composed of a specific character string, a specific figure, or a specific combination thereof;
an image data acquiring portion configured to acquire image data of a document;
a detection processing portion configured to detect the detection target information from the document based on the image data; and
a process executing portion configured to process the image data according to the processing content included in the automatic process setting information, when the detection target information included in the automatic process setting information is detected from the document by the detection processing portion, wherein
the storage portion stores a plurality of pieces of automatic process setting information, and
the process executing portion:
based on a detection result of the detection processing portion, individually generates groups of pages including the detection target information for each of the plurality of pieces of the automatic process setting information;
for each of the groups, processes the image data corresponding to the pages in the groups according to the processing content included in the automatic process setting information corresponding to the groups;
displays tabs that respectively correspond to the groups;
when a tab is selected from the tabs, displays a list of pages in a group that corresponds to the selected tab and a processing content corresponding to the group; and
in accordance with a user operation, selects to process, according to the processing content corresponding to the group, either a part of the image data of the document that corresponds to the pages in the group or the image data of the document that corresponds to all pages.

2. The image processing device according to claim 1, wherein
the preset processing content includes processing content relating to at least one of a transmission process, a print process, and a storage process of the image data.

3. The image processing device according to claim 1, wherein
the image data acquiring portion acquires the image data from an image reading portion for reading an image of the document.

4. The image processing device according to claim 1, wherein
when the detection target information is detected by the detection processing portion from a part of pages of the document having a plurality of pages, the process executing portion processes the image data corresponding to the part of pages, according to preset processing content corresponding to the detection target information.

5. The image processing device according to claim 1, wherein
when the detection target information is detected by the detection processing portion from a part of pages of the document having a plurality of pages, the process executing portion processes the image data corresponding to all of the plurality of pages of the document, according to preset processing content corresponding to the detection target information.

6. The image processing device according to claim 1, wherein
the detection target information includes a character string indicating a date satisfying a specific condition.

7. The image processing device according to claim 1, wherein
the preset processing content includes a print process for printing a number of copies of the image data according to a number of character strings detected by the detection processing portion satisfying a specific condition.

8. An image processing method in an image processing device including a storage portion for storing one or more pieces of automatic process setting information including detection target information and processing content corresponding to the detection target information composed of a specific character string, a specific figure, or a specific combination thereof, comprising:
an image data acquiring step of acquiring image data of a document;
a detection processing step of detecting the detection target information from the document based on the image data;
a process executing step of processing the image data according to the processing content included in the automatic process setting information, when the detection target information included in the automatic process setting information is detected from the document in the detection processing step;
a storage step of storing a plurality of pieces of automatic process setting information;
a generating step of, based on a detection result of the detection processing portion, individually generating groups of pages including the detection target information for each of the plurality of pieces of the automatic process setting information;
a processing step of, for each of the groups, processing the image data corresponding to the pages in the groups according to the processing content included in the automatic process setting information corresponding to the groups;
a displaying step of displaying tabs that respectively correspond to the groups;
a displaying step of, when a tab is selected from the tabs, displaying a list of pages in a group that corresponds to the selected tab and a processing content corresponding to the group; and a selecting step of, in accordance with a user operation, selecting to process, according to the processing content corresponding to the group, either a part of the image data of the document that corresponds to the pages in the group or the image data of the document that corresponds to all pages.

* * * * *